G. W. PITCHER.
Locket.
No. 105,721.
Patented July 26, 1870.
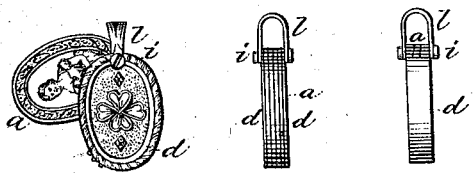
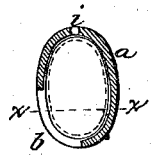
Witnesses:
Chas. H. Smith
Geo. D. Walker
Inventor:
Gurdon W. Pitcher

United States Patent Office.

GURDON W. PITCHER, OF BROOKLYN, NEW YORK.

Letters Patent No. 105,721, dated July 26, 1870.

TABLET LOCKET FOR PHOTOGRAPHS, &c.

The Schedule referred to in these Letters Patent and making part of the same.

*To all whom it may concern:*

Be it known that I, GURDON W. PITCHER, of Brooklyn, in the county of Kings and State of New York, have invented an Improved Tablet Locket for Photographs, &c.; and the following is declared to be a full and correct description thereof.

Lockets have been made as a case, with lids opening upon a hinge, and into these lids hair has been inserted, and sometimes photograph pictures have been placed beneath the glasses. These lockets are not, however, adapted to holding a number of photographic pictures, but lockets to open in the form of a book have been made for holding photographs.

My invention is made with special reference to the reception of photographs of many members of a family, or several intimate friends, in a small compass, and within an inclosing-case of a small or locket size, thereby enabling a person to carry about with him the likenesses of those he desires most to see, and that in a very small space.

I make use of frames of sheet metal that are each open upon one edge, for the insertion of the picture or pictures edgewise, and with a groove around inside of the frame for holding the edges of the pictures, and several of these frames are united by a screw or rivet passing through them, and also through an inclosing-case or shell, so that either frame can be swung out for the exhibition of the pictures, and a suspending-loop allows the locket to be hung from the watch-chain or guard, the whole forming a new and useful article of manufacture.

In the drawing—

Figure 1 is a side view of the case, with one of the frames swung out to show the picture;

Figures 2 and 3 are edge views of the locket;

Figure 4 is a section of one of the frames longitudinally; and

Figure 5 is a transverse view at the line $x\ x$.

Each frame $a$ is made in an oval, square, or rounded form, and at the edge of the frame an opening is made, as at $b$, to allow a photograph picture, or two pictures back to back, to be introduced and slipped into the frame, the edges being held within the groove or rebate that is made around the inside of the said frame $a$, as seen in figs. 4 and 5.

The frames may be of whatever shape is desired, the openings for the pictures being made in the edges.

Several of these frames are introduced into the case $d$, that is of a suitable ornamental character, and made with an opening at the side, so that the frames may be swung in or out, and they turn upon the rivet or screw $i$, that passes through them and the case $d$.

Thin sheet-metal washers may be inserted between the frames and around the screw $i$, to lessen friction.

I have shown the loop $l$ as extending across from one side of the case to the other, and held by the screw $i$, as a means for attaching this locket, but any other means for connecting the locket to the watch-chain or clothing may be employed.

Small projecting studs or knobs should be provided upon the edges of the frames, to facilitate the drawing or swinging out of the respective frames.

I claim as my invention—

The locket made of the frames $a$, having openings in the edges through which the pictures are to be slipped, in combination with the inclosing-case and attaching-pin or screw $i$, so that the frames can be swung out of the case edgewise, as set forth.

Dated this 25th day of June, 1870.

GURDON W. PITCHER.

Witnesses:
CHAS. H. SMITH,
GEO. T. PINCKNEY.